(12) United States Patent
Criminisi et al.

(10) Patent No.: US 7,809,183 B2
(45) Date of Patent: Oct. 5, 2010

(54) GAZE MANIPULATION

(75) Inventors: Antonio Criminisi, Cambridge (GB); Andrew Blake, Stapleford (GB); Philip H. S. Torr, Cambridge (GB); Jamie Shotton, Oxford (GB)

(73) Assignee: Microsoft Corporation, Redmond, WA (US)

( * ) Notice: Subject to any disclaimer, the term of this patent is extended or adjusted under 35 U.S.C. 154(b) by 1235 days.

(21) Appl. No.: 10/681,007

(22) Filed: Oct. 8, 2003

(65) Prior Publication Data

US 2005/0078865 A1    Apr. 14, 2005

(51) Int. Cl.
*G06K 9/00* (2006.01)
(52) U.S. Cl. ..................................... 382/154
(58) Field of Classification Search ............... 382/154, 382/106
See application file for complete search history.

(56) References Cited

U.S. PATENT DOCUMENTS

| | | | |
|---|---|---|---|
| 4,982,438 A * | 1/1991 | Usami et al. ............... | 382/154 |
| 5,359,362 A | 10/1994 | Lewis et al. | |
| 5,727,078 A * | 3/1998 | Chupeau .................... | 382/154 |
| 6,006,181 A * | 12/1999 | Buhrke et al. .............. | 704/231 |
| 6,046,763 A * | 4/2000 | Roy ............................. | 348/47 |
| 6,072,496 A | 6/2000 | Guenter et al. | |
| 6,198,852 B1 * | 3/2001 | Anandan et al. ............ | 382/284 |
| 6,304,288 B1 | 10/2001 | Hamagishi | |
| 7,015,951 B1 * | 3/2006 | Yoshigahara et al. ... | 348/207.99 |
| 7,620,247 B2 * | 11/2009 | Matsushita et al. ......... | 382/217 |

OTHER PUBLICATIONS

U.S. Appl. No. 09/528,827, Microsoft Corporation, Mar. 20, 2000, Filing Date.

Basu, Sumit, Essa, Irfan, Pentland, Alex; "Motion Regularization for Model-Based Head Tracking." In Proceedings of International Conference on Pattern Recognition, Wien, Austria, 1996 IEEE, pp. 611-616.

Belhumeur, Peter N.; Mumford, David "A Bayesian Treatment of the Stereo Correspondence Problem Using Half-Occluded Regions" IEEE Conference on Computer Vision and Pattern Recognition, 1992, 8pgs.

Black, Michael J., Yacoob, Yaser; "Tracking and Recognizing Rigid and Non-Rigid Facial Motions Using Local Parametric Models of Image Motion"; IEEE Proceedings of International Conference on Computer Vision, Cambridge, MA, 1995, pp. 374-381.

Bobick, Aaron F., Intille, Stephen S.; "Large Occlusion Stereo"; HCV 1999, pp. 1-25.

Chen, Shenchang Eric, Williams, Lance; "View Interpolation for Image Synthesis"; SIGGRAPH, 1993, pp. 1-7.

Choi, Chang Seok, Aizawa, Kiyoharu, Harashima, Hiroshi, Takebe, Tsuyoshi; "Analysis and Synthesis of Facial Image Sequences in Model-Based Image Coding" IEEE Transaction on Circuits and Systems for Video Technology v. 4, n 3 Jun. 1994, pp. 257-275.

(Continued)

*Primary Examiner*—Vu Le
*Assistant Examiner*—Alex Liew

(57) ABSTRACT

A multi-layer graph for dense stereo dynamic programming can improve synthesis of cyclopean virtual images by distinguishing between stereo disparities caused by occlusion and disparities caused by non-fronto-parallel surfaces. This distinction can be leveraged to reduce image artifacts, such as "halos". Distinguishing at least between these two types of disparities allows improved matching of left and right pixel data, which increases the amount of correct pixel information used in constructing the cyclopean virtual image and minimizes occlusion artifacts.

45 Claims, 16 Drawing Sheets

OTHER PUBLICATIONS

Cox, Ingemar J., Hingorani, Sunita L., Rao, Satish B., Maggs, Bruce M.; "A Maximum Likelihood Stereo Algorithm" Computer vision and Image Understanding, May 1996, pp. 542-567 (1-47).

Darrell, Trevor, Baback, Moghaddam, Pentland, Alex P.; "Active Face Tracking and Pose Estimation in an Interactive Room" IEEE Computer Vision and Pattern Recognition, 1996, pp. 67-72 (1-16).

DeCarlo, Douglas, Metaxes, Dimitris; "Optical Flow Constraints on Deformable Models with Applications to Face Tracking" International Journal of computer Vision, 2000, pp. 99-127 (1-42).

Gemmell, Jim, Toyama, Kentaro, Zitnick, C. Lawrence, Kang, Thomas, Seitz, Steven; "Gaze Awareness for Video-Conferencing: A Software Approach" Oct.-Dec. 2000, pp. 26-35.

Horprasert, Thanarat, Yacoob, Yaser, Davis, Larry S.; "Computing 3-D Head Orientation From a Monocular Image Sequence"; Interantional Conference Automatic Face and Gesture Recognition, 1996, pp. 242-247.

Ishikawa, Hiroshi, Geiger, Davi; "Occlusions, Discontinuities, and Epipolar Lines in Stereo" The Fifth European Conference on Computer Vision (ECCV '98) Jun. 1998, Germany pp. 1-14.

Kolmogorov, Vladimir, Zabih, Ramin; "Multi-Camera Scene Reconstruction via Graph Cuts"; Proc. Europ. Conf. Computer Vision, Copenhagen, Denmark, May 2002, pp. 1-16.

Li, Haibo, Roivainen, Pertti, Forchheimer, Robert; "3-D Motion Estimation in Model-Based Facial Image Coding" IEEE Transactions on Pattern Analysis and Machine Intelligence, v. 15, n 6, Jun. 1993, pp. 545-555.

Liu, Zicheng, Zhang, Zhengyou, Jacobs, Chuck, Cohen, Michael; "Rapid Modeling of Animated Faces from Video" Proceedings of the Fourth IEEE International Conference on Automatic Face and Gesture Recognition Feb. 2000, pp. 58-67.

Loop, Charles, Zhang, Zhengyou; "Computing Rectifying Homographies for Stereo Vision" Technical Report MSR-TR-99-21, 14 pgs.

Lu, Le, Zhang, Zhengyou, Shum, Heung-Yeung, Liu, Zicheng, Chen, Hong; "Model and Exemplar-Based Robust Head Pose Tracking Under Occlusion and Varying Expression" IEEE Computer Soc. Conf. on Computer Vision & Pattern Recog., Dec. 2001, Hawaii, USA, pp. 1-8.

Newman, Rhys, Matsumoto, Yoshio, Rougeaux, Sebastien, Zelinsky, Alexander, "Real-Time Stereo Tracking for Head Pose and Gaze Estimation" IEEE 2000 pp. 122-128.

Ohta, Yuichi, Kanade, Takeo; "Stereo by Intra-and Inter-Scanline Search Using Dynamic Programming" IEEE 1985, 16 pgs.

Roy, Sebastien, Cox, Ingemar J.; "A Maximum-Flow Formulation of the N-Camera Stereo Correspondence Problem" IEEE Proc. of Int. Conference on Computer Vision, Bombai, Jan. 1998, pp. 492-499.

Scharstein, Daniel, Szeliski, Richard, Zabih, Ramin; "A Taxonomy and Evaluation of Dense Two-Frame Stereo Correspondence Algorithms"; International Journal of Computer Vision, 2002, 10pgs.

Scharstein, Daniel, "Stereo Vision for View Synthesis" IEEE Computer Society Conference on Computer Vision and Pattern Recognition, San Francisco, CA, Jun. 1996 pp. 852-858.

Shi, Jianbo, Tomasi, Carlo; "Good Features to Track"; IEEE Conference on Computer Vision and Pattern Recognition, Seattle WA, Jun. 1994, 7pgs.

Sun, Jian, Shum, Heung-Yeung, Zheng, Nan-Ning; "Stereo Matching Using Belief Propagation" ECCV 2002, pp. 510-524.

Szeliski, Richard; "Prediction Error as a Quality Metric for Motion and Stereo" Vision Technology Group Microsoft Research, Proceeding of the International Conference on Computer Vision, vol. 2, Corfu, Greece, 1999, 8pgs.

Vetter, Thomas "Synthesis of Novel Views From a Single Face Image" Max-Planck-Institut, Germany, Technical Report No. 26, Feb. 1996, pp. 1-13.

Yang, Ruigang, Zhang, Zhengyou; "Eye Gaze Correction with Stereovision for Video-Teleconferencing" Proceedings from the European Conference of Computer Vision, vol. 2, Copenhagen, Denmark May 2002, pp. 479-494.

Zhang, Zhengyou, Liu, Zicheng, Adler, Dennis, Cohen, Michael F., Hanson, Erik, Shan, Ying; "Robust and Rapid Generation of Animated Faces from Video Images: A Model-Based Modeling Approach" Technical Report MSR-TR-2001-101 pp. 1-30.

* cited by examiner

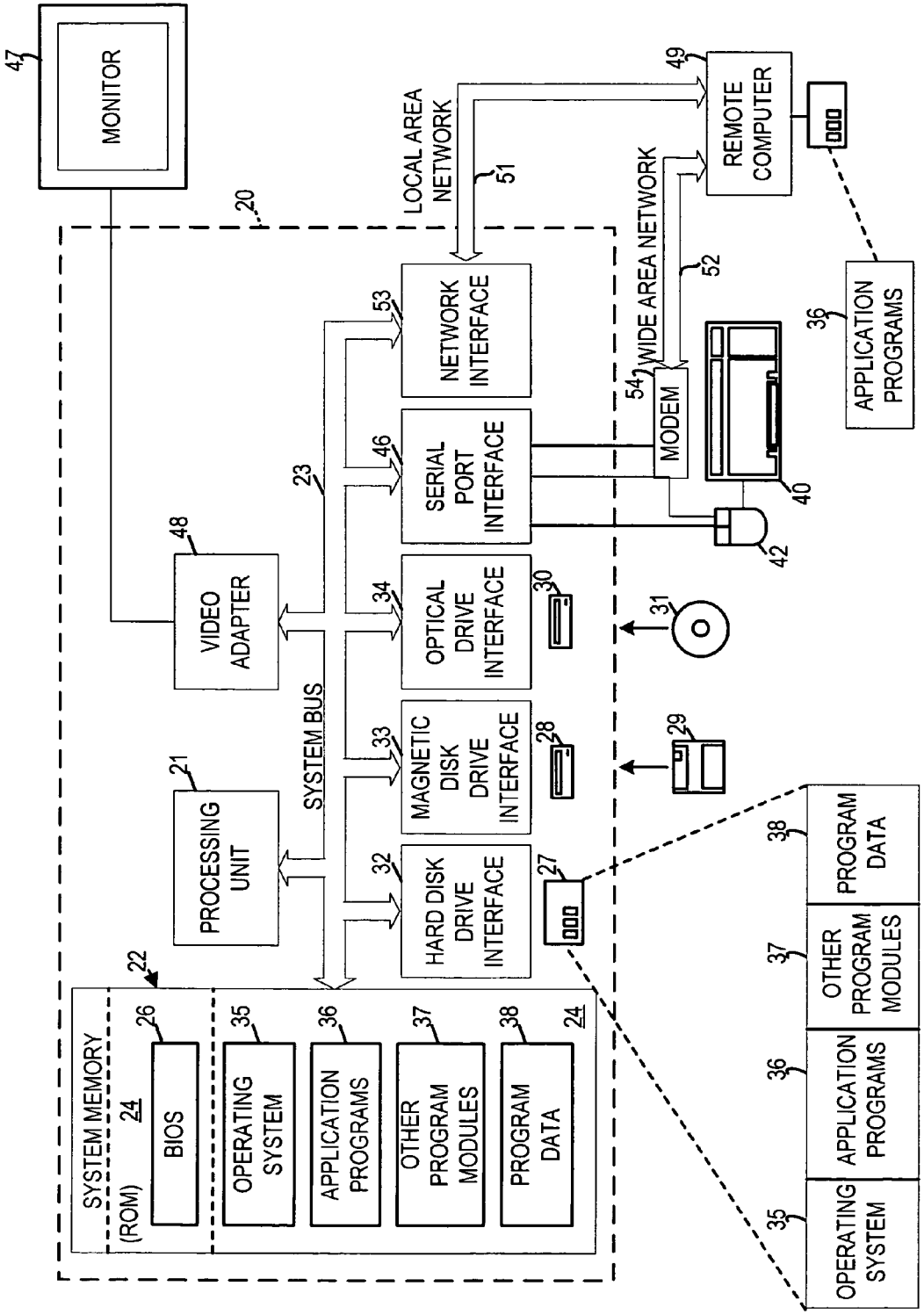

GAZE MANIPULATION

TECHNICAL FIELD

The invention relates generally to image processing, and more particularly to gaze manipulation using image processing.

DESCRIPTION

Digital video cameras are useful in both consumer and professional contexts. Generally, digital video cameras capture sequences of digital images, which may then be transferred to a computer system for display or processing or to storage device for storage.

One specific practice employs a digital video camera in a video conferencing application. In a typical video conference, an image sequence depicting a conference participant is transmitted to one or more other participants. Concurrently, image sequences depicting the other participants are transmitted to the first participant's display device. In this manner, each participant can view an interactive video of the other participants during the conference.

In a typical video teleconferencing environment, a single video camera is focused on a conference participant, who views the other participants in a video window in his or her display device. The video camera is commonly mounted on or near the display of a computer or television system in an attempt to minimize the angle between the camera and the video window. Minimizing this angle can enhance the illusion that the participant is looking into the camera instead of at the video window in the display device. However, the angle is never really eliminated and in fact can remain significant, particularly when the camera is close to the participant. As a result, for example, the other participants receive a display of the top or side of the first participant's head, instead of a straight-on view of the first participant's face.

This situation provides a diminished user experience and limits the effectiveness of such video conferencing. It is difficult to develop trust between participants in the conference because of the difficulty in establishing eye contact (i.e., the displayed participant is looking at his or her display instead of the camera). Likewise, facial expressions may be distorted or obscured by the angular discrepancy, thereby losing some important communication cues.

Conceptually, these problems may be resolved by a physical camera positioned in the center of the display window, such that the participant's gaze and the camera's axis are aligned—envision a video display with a hole drilled in the middle of it in which to mount the camera. However, such configurations are impractical for obvious reasons.

Some of these problems have been addressed by generating a cyclopean virtual image, which approximates an image "captured" by a virtual camera positioned between stereo cameras, whether centered or not-centered. Such approaches, however, have not directly or sufficiently addressed certain artifacts that result from attempting to combine a pair of stereo images. Some of these artifacts are, for example, due to the difficulty of matching corresponding pixels across images and reconstructing occluded regions.

For example, visualize a subject sitting in view of two horizontally positioned stereo cameras. One camera may be able to view a doorknob behind and slightly to the side of the subject's head, while the second camera cannot view the doorknob because the subject's head occludes the doorknob from the second camera's view. In the previously mentioned cyclopean virtual imaging techniques, and in other approaches, the difficulty of reconstructing such occluded regions in the cyclopean image often results in a "halo" effect around the subject's head as well as other artifacts in the image.

Implementations described and claimed herein address these problems with a multi-layer graph for dense stereo dynamic programming to improve processing of occluded regions. Use of a multi-layer graph for dense stereo dynamic programming allows an algorithm to distinguish between stereo disparities caused by occlusion and disparities caused by non-fronto-parallel surfaces. This distinction can be leveraged to reduce the occlusion effects, such as "halos". In addition, anisotropic smoothing may be used to improve scan line matching. Also, temporal background layer maintenance may be used to reduce temporal artifacts.

In various implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. The computer program product encodes a computer program for executing on a computer system a computer process that computes a minimum cost path in a stereo disparity model between a scan line of a first image and a corresponding scan line of a second image of a stereo image pair. The stereo disparity model distinguishes between non-fronto-parallel matched pixels in each scan line and occluded pixels in each scan line.

In another implementation, a method computes a minimum cost path in a stereo disparity model between a scan line of a first image and a corresponding scan line of a second image of a stereo image pair. The stereo disparity model distinguishes between non-fronto-parallel matched pixels in each scan line and occluded pixels in each scan line.

In yet another implementation, a system provides a dynamic programming module computing a minimum cost path in a stereo disparity model between a scan line of a first image and a corresponding scan line of a second image of a stereo image pair. The stereo disparity model distinguishes between non-fronto-parallel matched pixels in each, scan line and occluded pixels in each scan line.

Other implementations are also described and recited herein.

Brief descriptions of the drawings included herein are listed below.

Figure 6:
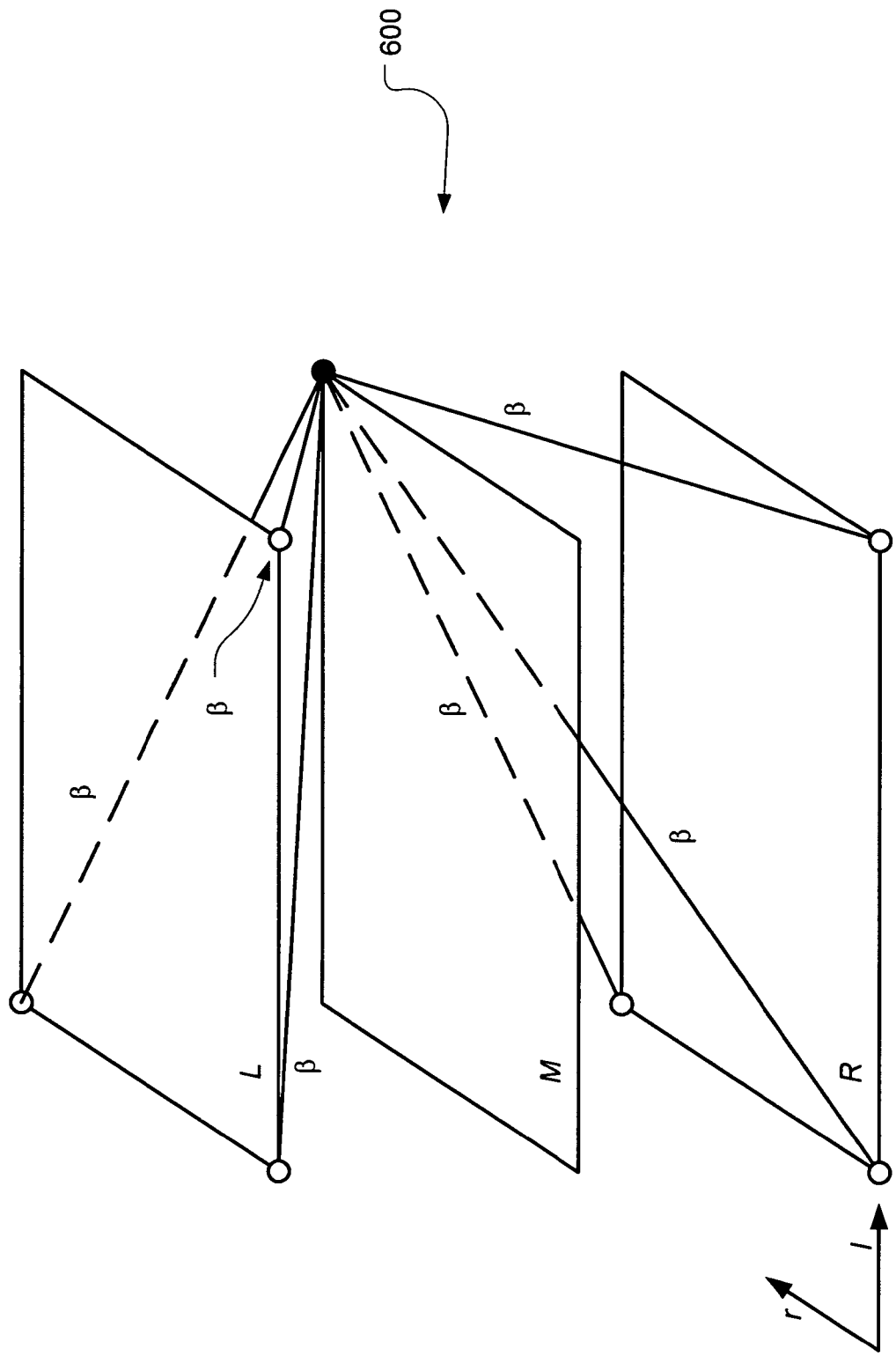
Figure 7:
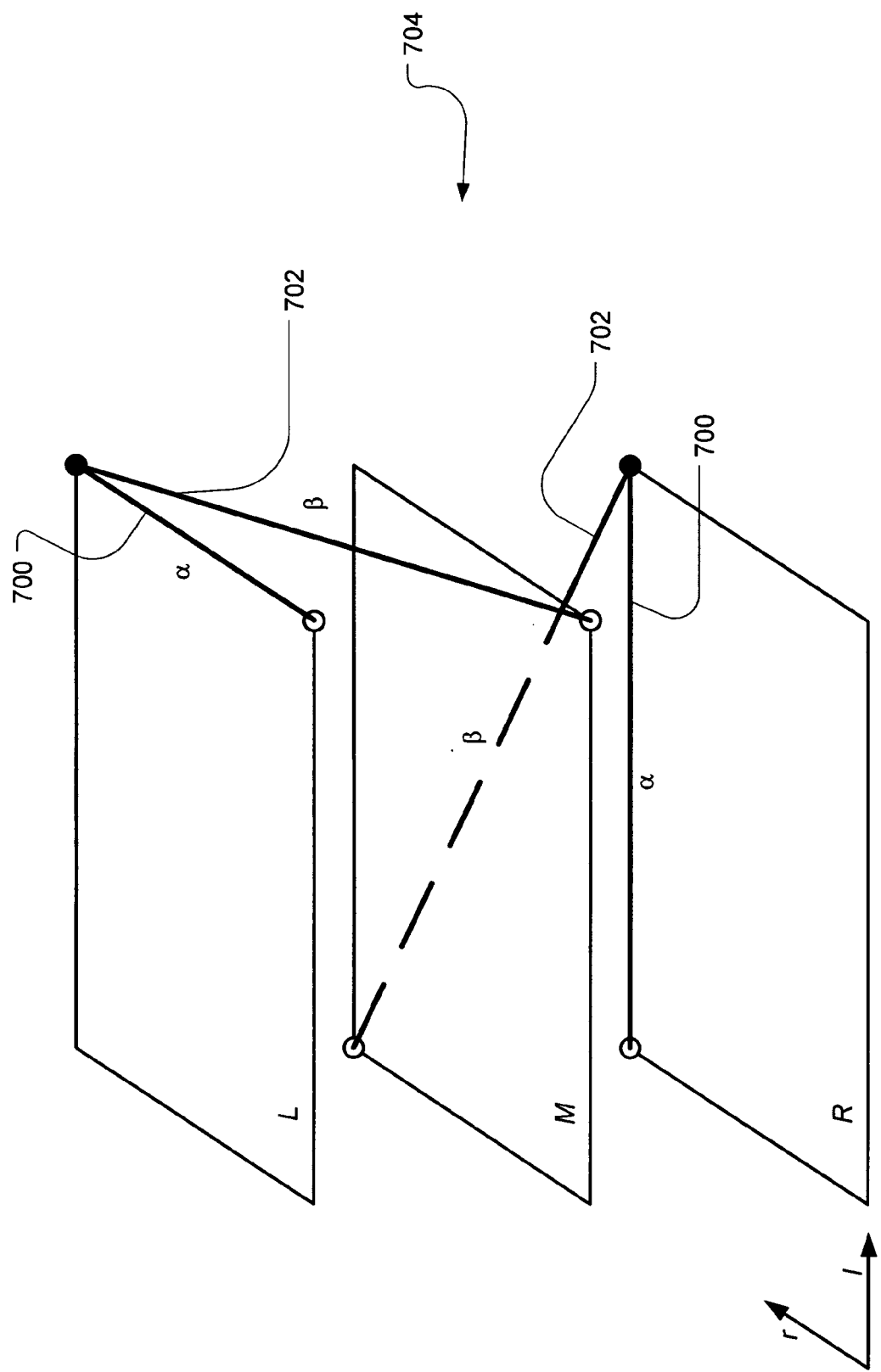
Figure 8:
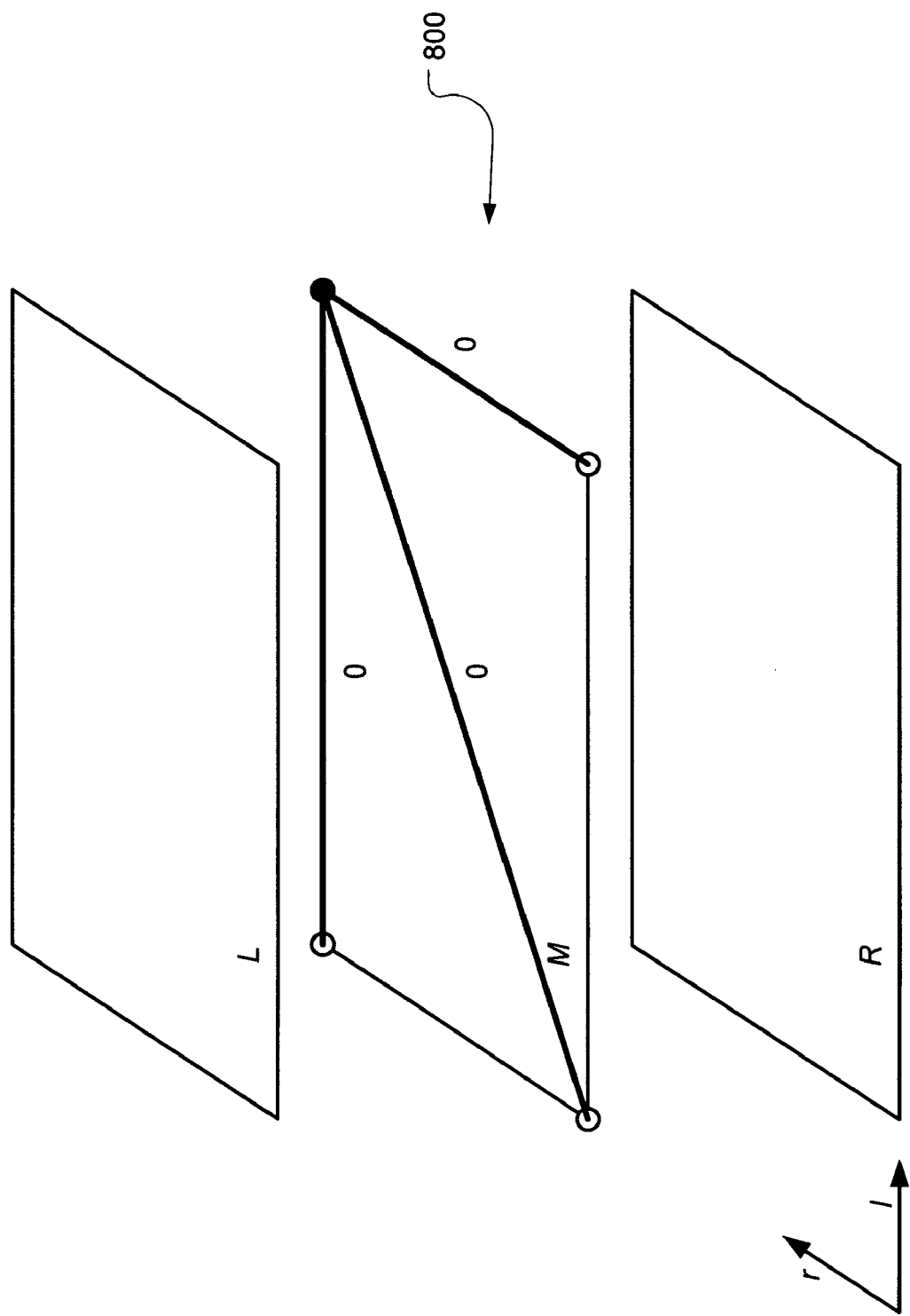

FIGS. 6, 7, and 8 combine to represent an exemplary three-plane representation of the five-move disparity model.

Figure 9:
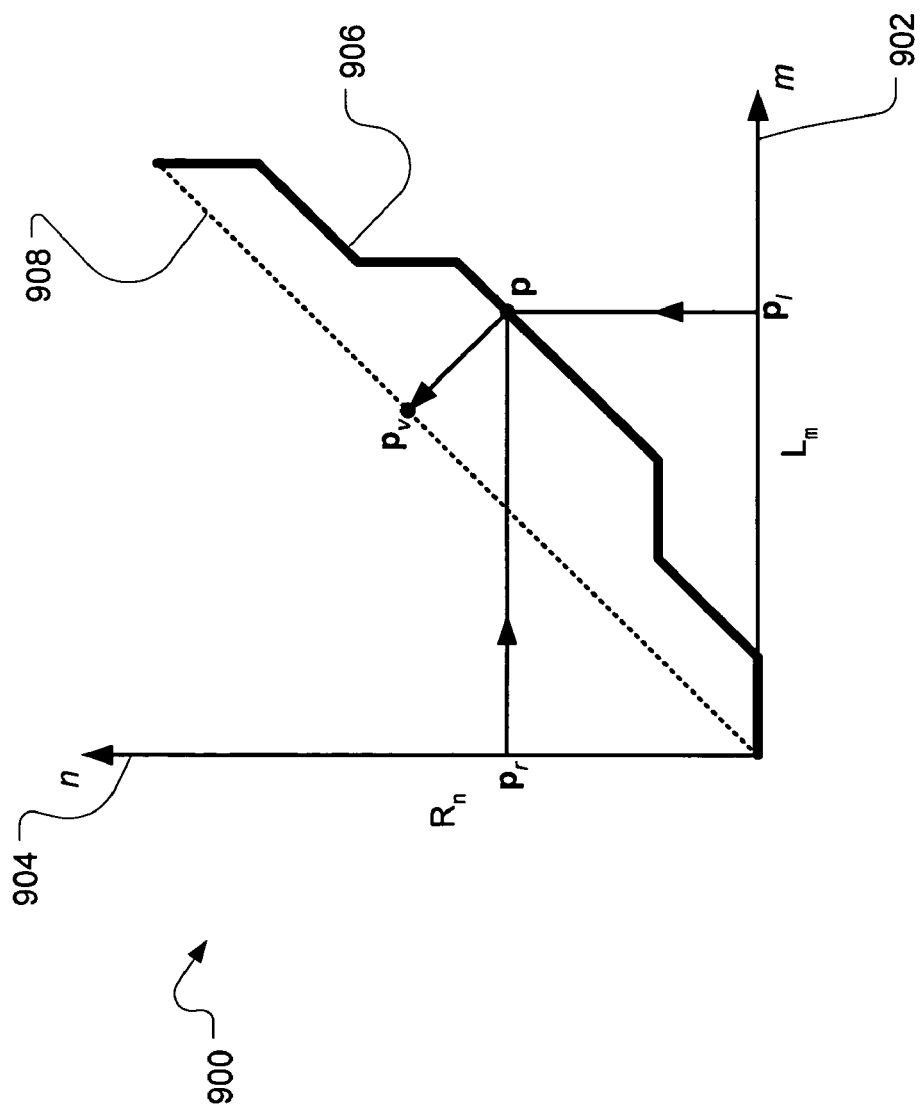

FIG. 9 illustrates an exemplary stereo disparity graph for matched points.

Figure 10:
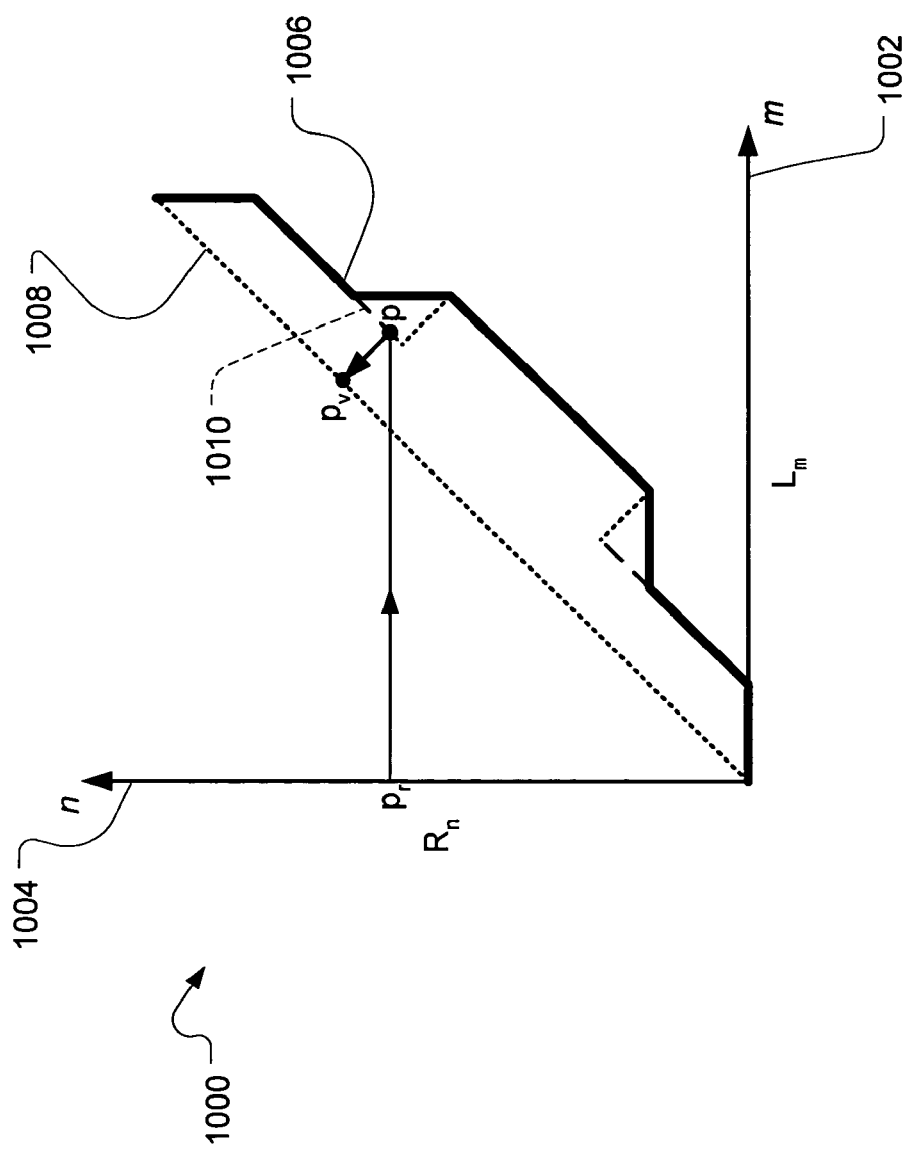

FIG. 10 illustrates an exemplary stereo disparity graph for occluded points.

Figure 11:
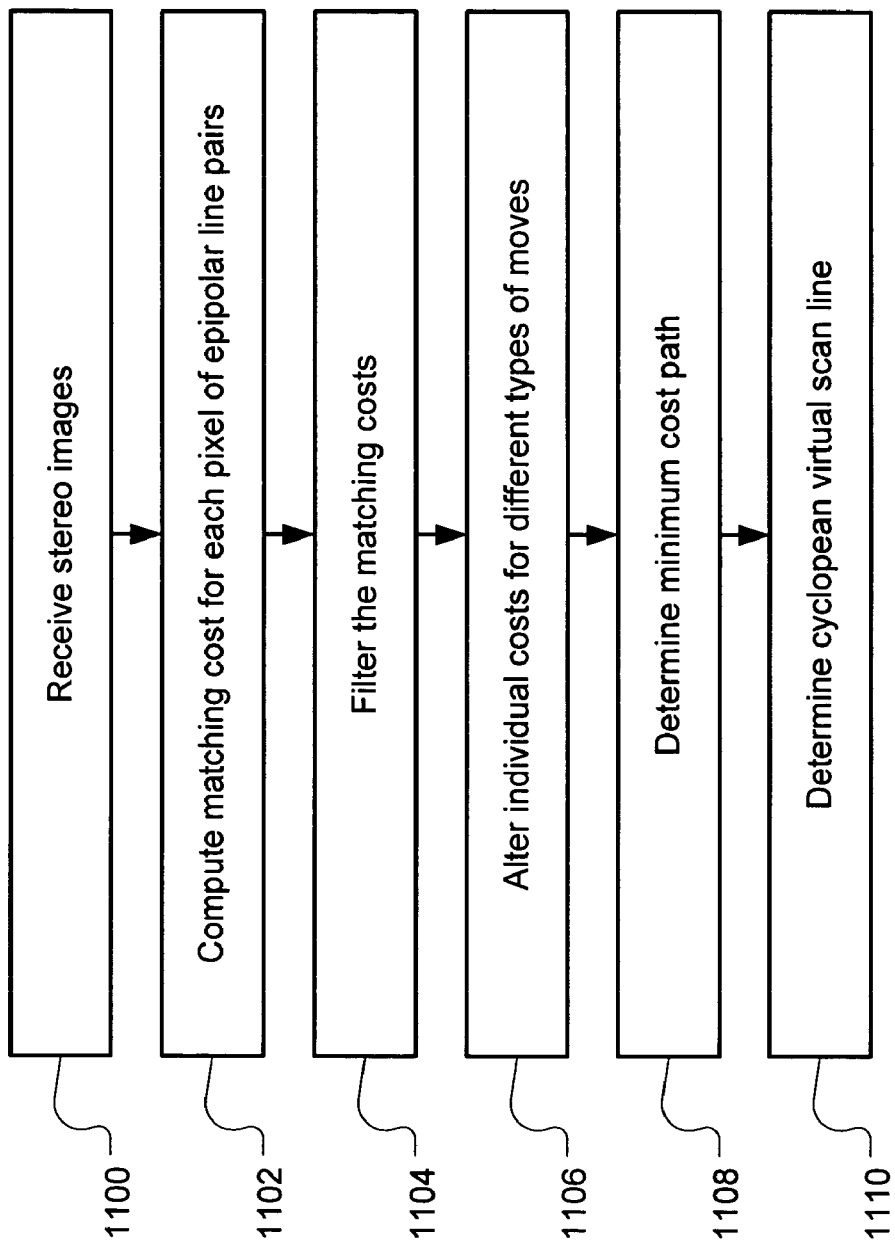

FIG. 11 illustrates exemplary operations for performing gaze manipulation.

Figure 12:
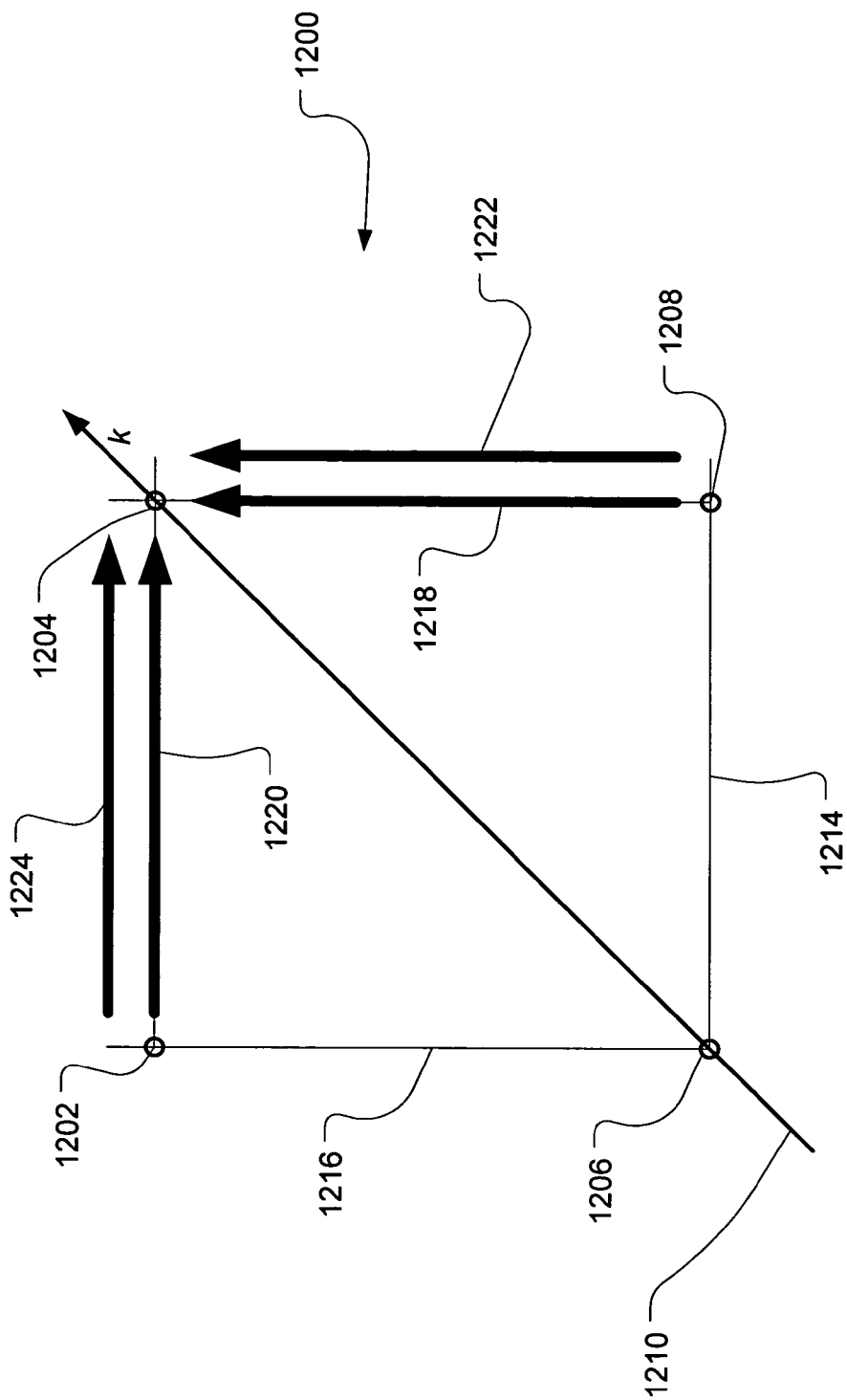

FIG. 12 illustrates an exemplary four-move disparity process model.

Figure 13:
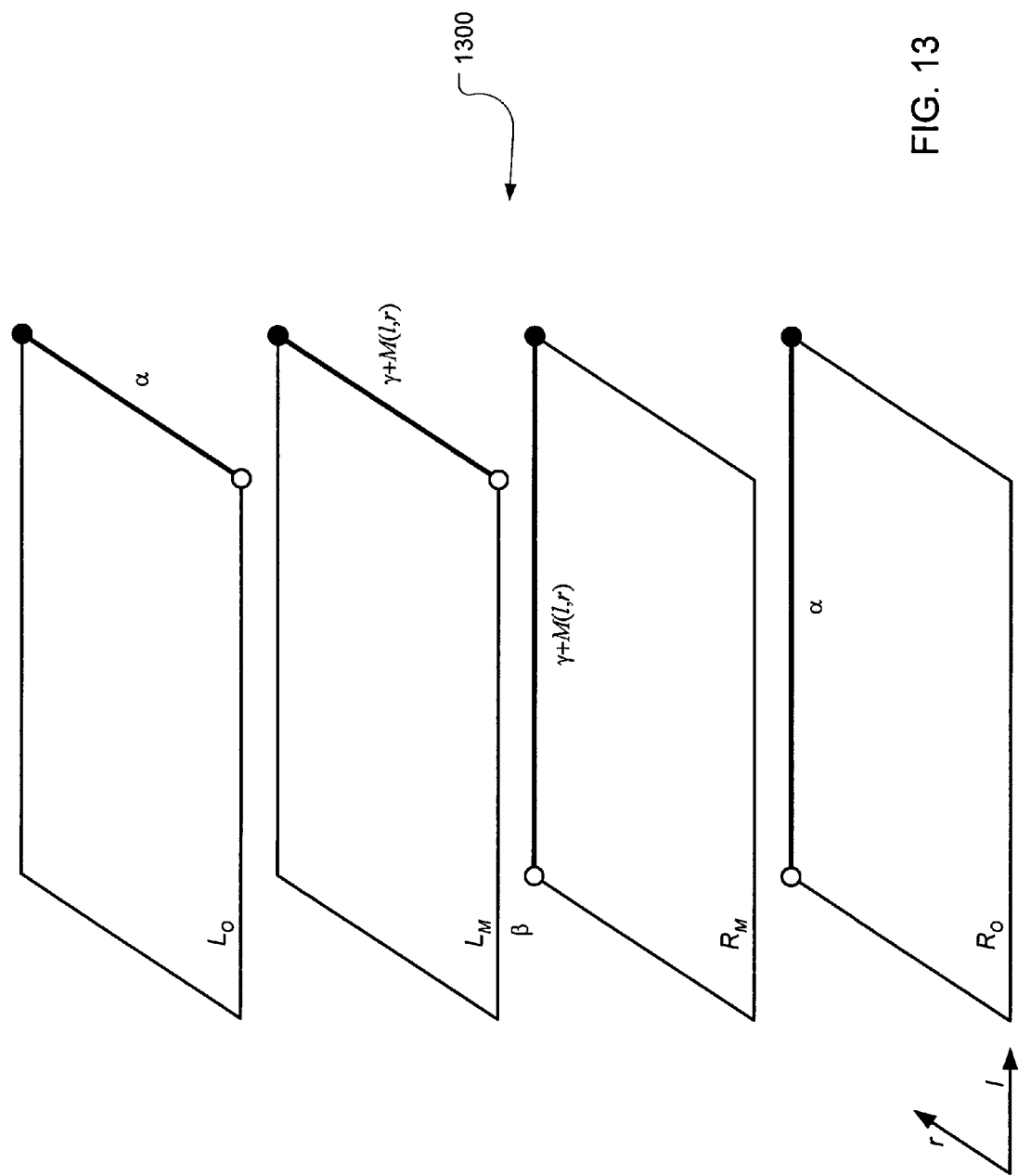
Figure 14:
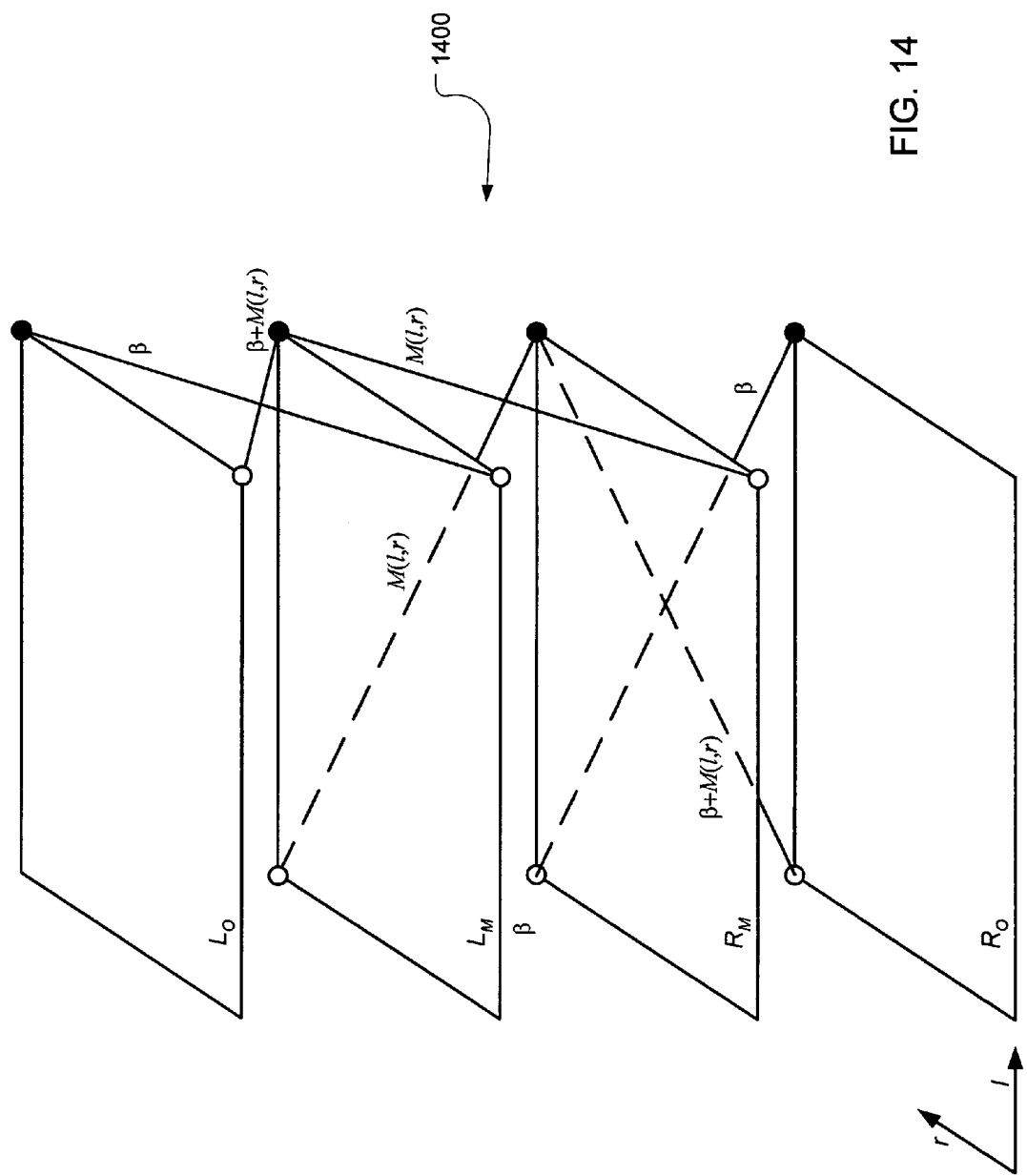
Figure 15:
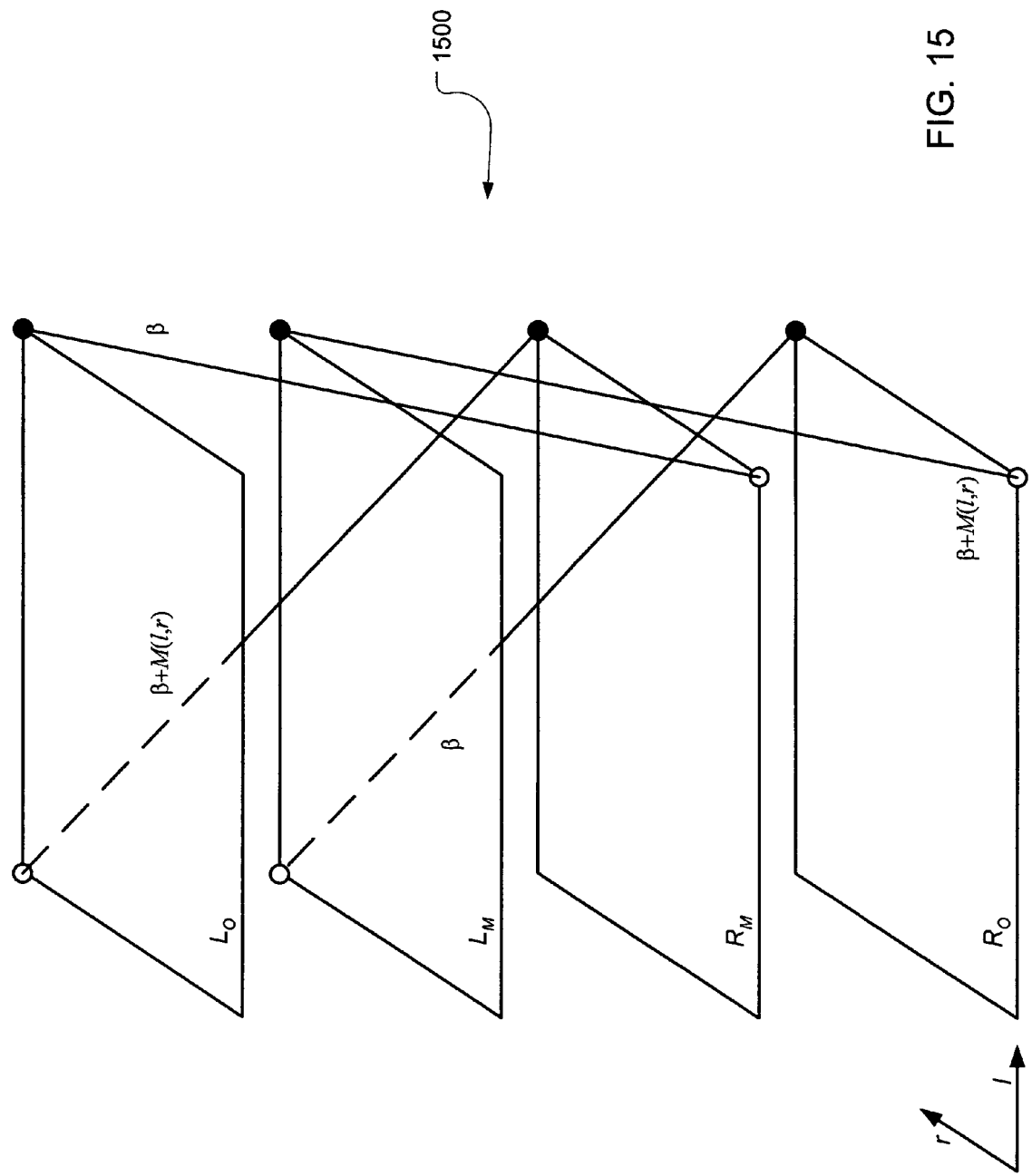

FIGS. 13, 14, and 15 combine to represent a four-plane representation of the four-move disparity model.

FIG. 16 illustrates an exemplary system useful for implementing an embodiment of the present invention.

A multi-layer graph for dense stereo dynamic programming can improve synthesis of cyclopean virtual images by distinguishing between stereo disparities causes by occlusion and disparities caused by non-fronto-parallel surfaces. This distinction can be leveraged to reduce the occlusion effects, such as "halos". Generally, occlusion refers to an image region that is captured by one camera but is not captured by a second camera because of an obstruction in the second camera's view (e.g., a video conference participant's head occluding a region of the background from the second camera's view). Furthermore, a fronto-parallel surface refers to a surface that is substantially parallel to an axis connecting the left and right cameras. The axis may be referred to as the "baseline". As such, a non-fronto-parallel surface slants away from one camera or the other. Distinguishing at least between these two types of disparities allows improved matching of left and right pixel data, which increases the amount of correct pixel information used in constructing the cyclopean virtual image and minimizes occlusion artifacts.

Figure 1:
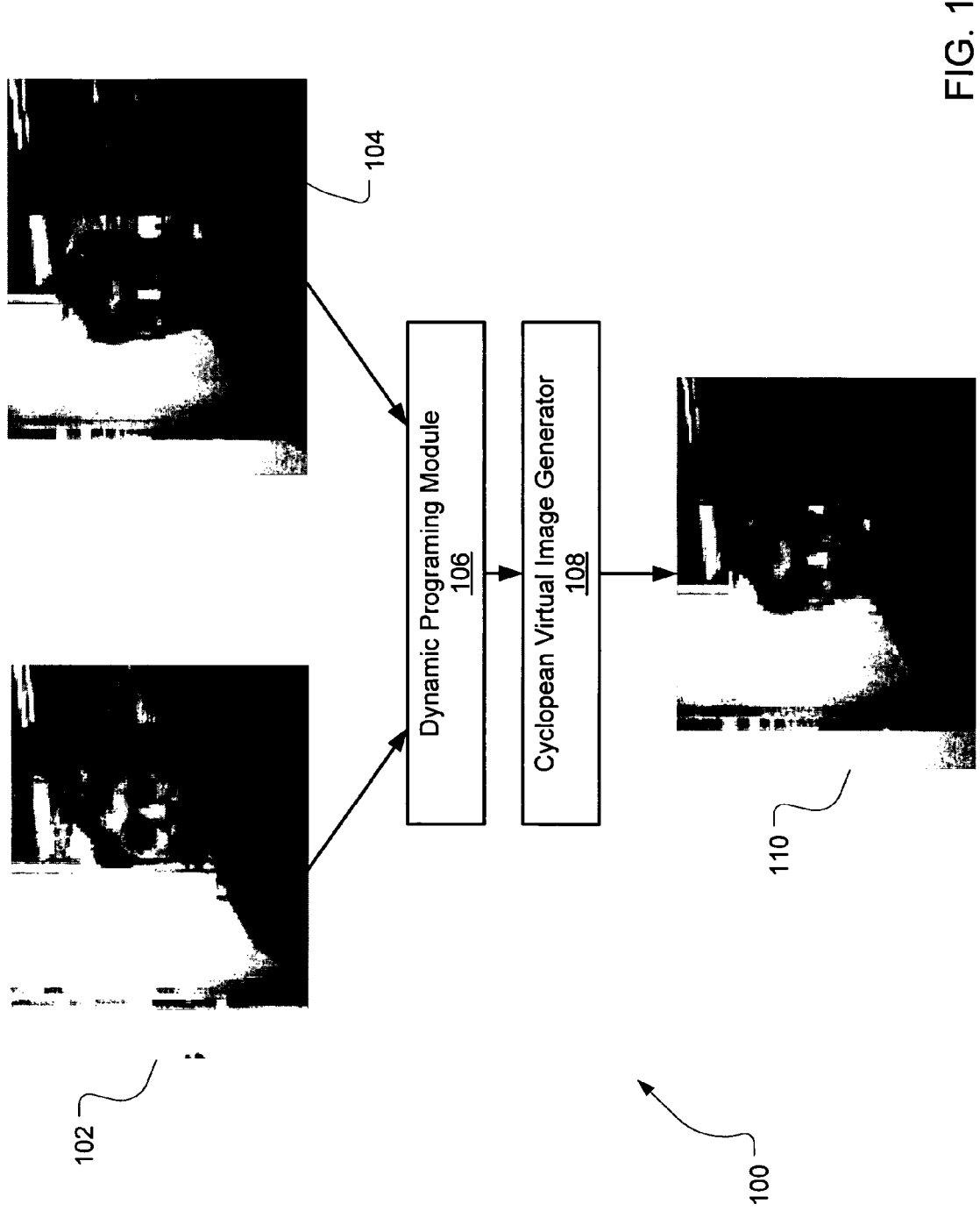
FIG. 1 illustrates an exemplary system for generating a cyclopean virtual image with gaze manipulation.

FIG. 1 illustrates an exemplary system 100 for generating a cyclopean virtual image with gaze manipulation. In the system 100, a left image 102 is captured by a camera mounted on the right side of the video display, as seen by the user. Likewise, a right image 104 is captured by a camera mounted on the left side of the video display, as seen by the user. As such, in both images, the user can be seen looking into the video display, as opposed to looking directly at one of the cameras. The left and right images 102 and 104 are input to a dynamic programming module 106, which generates a stereo disparity graph for each corresponding pair of epipolar lines of the images 102 and 104. In the illustrated implementation, a three-plane model for the dynamic programming is used, although other graphs may be employed, such as a four-plane model, etc.

The stereo disparity graph generated by the dynamic programming module is input to a cyclopean virtual image generator 108, which uses pixel characteristics of corresponding pixels associated with a minimum cost path in the stereo disparity graph to generate the cyclopean virtual image 110 with gaze correction. As a result, the cyclopean virtual image 110 shows the user as appearing to look directly into the camera.

Figure 2:
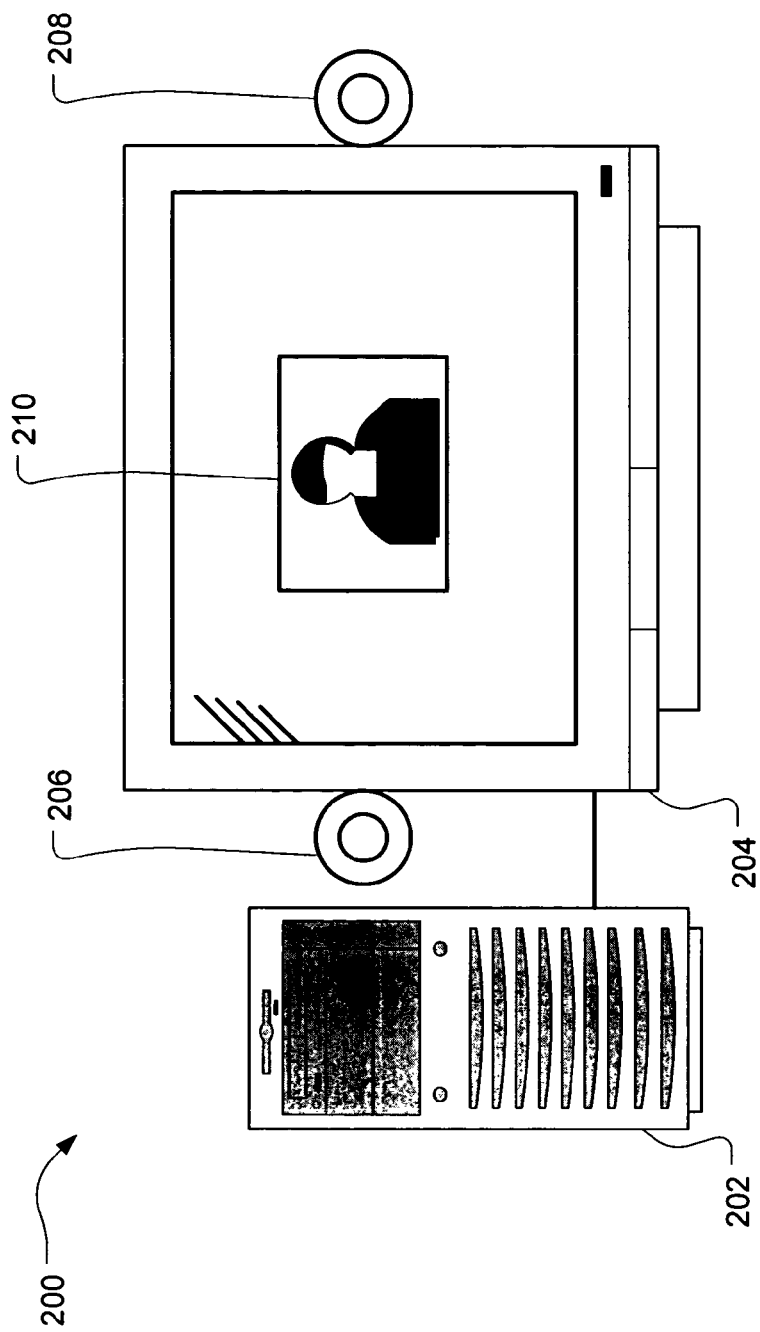
FIG. 2 illustrates an exemplary video conferencing system configuration 200 for generating a cyclopean virtual image with gaze manipulation.

FIG. 2 illustrates an exemplary video conferencing system configuration 200 for generating a cyclopean virtual image with gaze manipulation. A computer system 202 is coupled to a video display 204 having two cameras 206 and 208 mounted on either side of the video display 204. A video window 210 displays a remote participant on the other end of the video conference session.

In a configuration having only a single camera, the user typically focus his or her eyes on the video window 210, while the single camera captures images of the user from one side of the other. As such, the captured images sent to the remote participant are primarily a side view of the user's head, not a straight-on view of the user's face. The illustrated configuration, however, allows generation of a cyclopean virtual image from the captured left and right images of the user.

The cyclopean virtual image generation synthesizes the cyclopean virtual image from a stereo disparity graph representing the disparity field between corresponding left and right images. Furthermore, the dynamic programming applied to the disparity graph distinguishes between disparities caused by occlusion and disparities caused by non-fronto-parallel surfaces in the view field.

It should be understood that more than two cameras may also be used to generate a cyclopean virtual image. Likewise, the cameras may be in alternative orientations, such as at the top and bottom of the video display. For example, one configuration may include four cameras, each placed at a corner of the video display.

The cyclopean virtual image $\hat{I}$ is synthesized from intensity functions $L=\{L_m, m=0,\ldots,N\}$ and $R=\{R_n, n=0,\ldots,N\}$, which represent epipolar lines (or scan lines) of observed (i.e., captured) left and right images. A matched pair $(L_m, R_n)$ has "stereo disparity" of $d=n-m$, which may be considered a measure of "parallax". In one implementation, each image contains color pixels in three color channels, such that $L_m$, $R_n \in \mathfrak{R}^3$. In a more general setting, however, there may be other features, such that $L_m, R_n \in \mathfrak{R}^f$, where f is an integer. For example, groups of pixels may be filtered to obtain improved invariance to illumination variations or non-uniform camera sensitivities.

A cyclopean epipolar line (i.e., the corresponding scan line in the virtual cyclopean image) is represented by $I=\{I_k, k=0,\ldots,2N\}$. The cyclopean virtual image $\hat{I}$ is constructed from a set of cyclopean epipolar lines stacked line-by-line to form the resulting cyclopean image.

Figure 3:
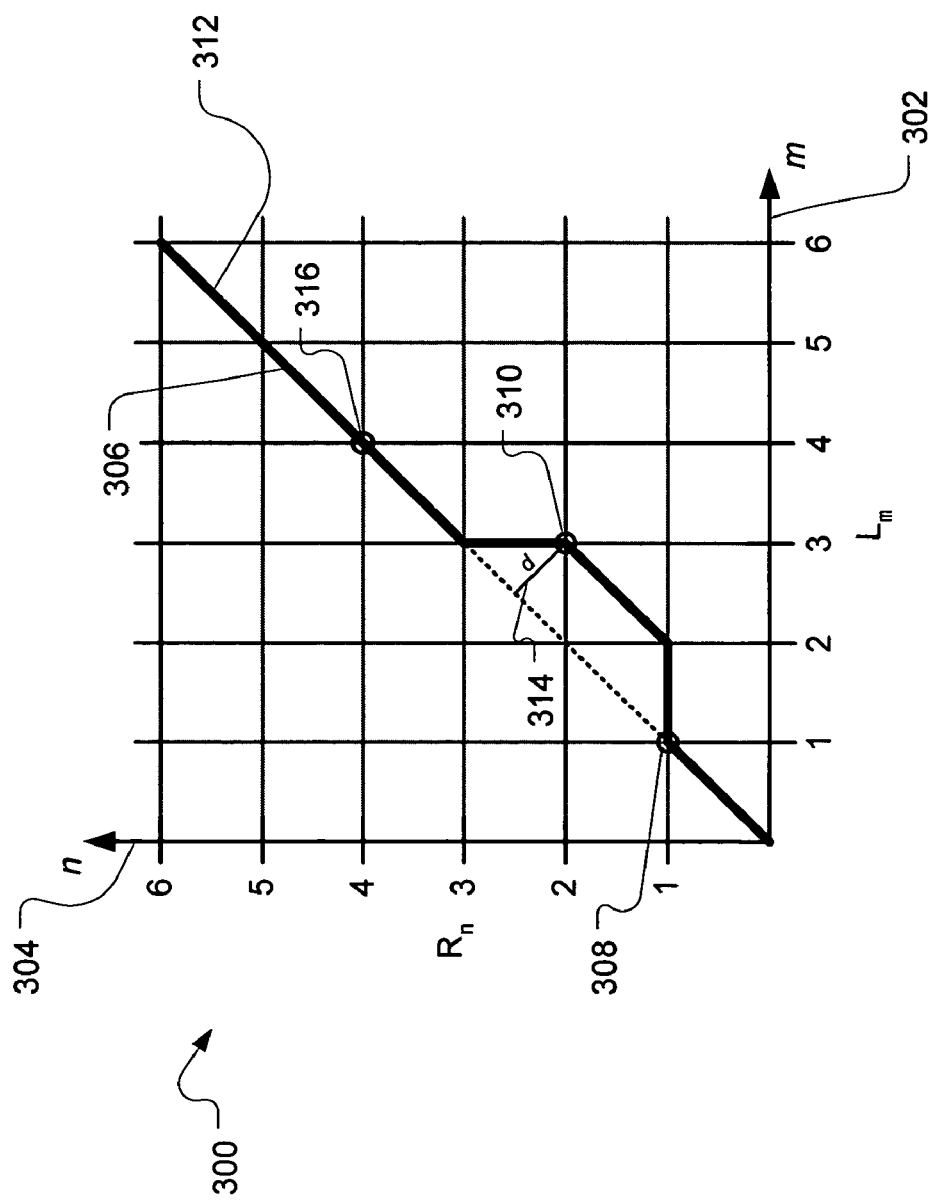
FIG. 3 illustrates stereo disparity as a function of left and right epipolar lines L and R, which are defined in terms of pixel coordinates m and n, respectively.

FIG. 3 illustrates stereo disparity as a function of left and right epipolar lines L and R, which are defined in terms of pixel coordinates m and n, respectively. The stereo disparity between the left and right stereo images is defined as a vector $d=\{d_k, k=0,\ldots,2N\}$ having components expressed in cyclopean coordinates k.

A diagram 300 shows an axis 302, representing a sequence of positions along a left epipolar line L, and another axis 304 representing a sequence of positions along a right epipolar line R. A minimum cost path 306 indicates matches between pixels in given sequential positions in L with pixels in given sequential positions in R. For example, pixel 1 of L matches pixel 1 of R, as shown by point 308. In contrast, pixel 3 of L matches pixel 2 of R, as shown by point 310. The disparity associated with a point 310 on the minimum cost path 306 is defined as the orthogonal distance of the point from a virtual scan line 312 (or zero disparity axis or zero parallax axis). For example, the disparity of the point 308 is zero, whereas the disparity d of the point 310 is shown by line 314. (As suggested by the disparity axis of FIG. 4, the disparity of point 310 is "−1".)

Accordingly, the minimum cost path 306 represents a two-dimensional profile of a scan line of the virtual image, where pixels with a greater absolute value of disparity (e.g., point 310, which has a negative disparity relative to the zero parallax line 312) are closer to the virtual cyclopean camera—e.g., the video subject—than pixels with a lower absolute value of disparity (e.g., point 316, which has a zero disparity relative to the zero parallax line 312), which are deemed farther away from the virtual cyclopean camera—e.g., the background. Stacking a set of these two-dimensional profiles, which correspond to individual cyclopean epipolar lines, can yield a three-dimensional profile surface of the image subject.

A matching cost function may be used to determine the minimum cost path in a stereo disparity graph. A variety of matching cost functions may be employed to compute the matching two pixels. However, using some traditional techniques, processing individual epipolar line pairs independently can cause visible "streaky" artifacts in the output disparity graph. Therefore, by using neighborhood windows in computing the cost of matching two pixels, the "independence" of the scan lines can be compromised, thereby reducing streaky artifacts.

In one implementation, a windowed Normalized Sum of Squared Differences (SSD) matching function is used to compute the matching cost M(l,r) for every pair of pixels along corresponding epipolar lines:

$$M_{ssd}(l, r) = \frac{M'(l, r)}{2} \text{ with} \quad (1)$$

$$M'(l, r) = \frac{\sum_{\delta \in \Omega} [(I^l_{p_l+\delta} - \bar{I}^l_{p_l}) - (I^r_{p_r+\delta} - \bar{I}^r_{p_r})]^2}{\sum_{\delta \in \Omega} (I^l_{p_l+\delta} - \bar{I}^l_{p_l})^2 + \sum_{\delta \in \Omega} (I^r_{p_r+\delta} - \bar{I}^r_{p_r})^2} \quad (2)$$

where $\Omega$ is an n×m generic template patch centered at the origin of the coordinate system; $p_l$ and $p_r$ are pixel positions (2-vectors) in the left and right images, respectively; and $\delta$ is a variable 2D displacement vector. The "bar" above a variable (e.g., $\bar{I}$) represents the mean operator.

In FIGS. 6, 7, and 8 combine to represent a 3-plane representation of the 5-move disparity model another implementation, a Normalized Cross-Correlation (NCC) matching cost may be employed:

$$M_{ncc}(l, r) = \frac{1 - M'(l, r)}{2} \text{ where} \quad (3)$$

$$M'(l, r) = \frac{\sum_{\delta \in \Omega} (I^l_{p_l+\delta} - \bar{I}^l_{p_l})(I^r_{p_r+\delta} - \bar{I}^r_{p_r})}{\sqrt{\sum_{\delta \in \Omega} (I^l_{p_l+\delta} - \bar{I}^l_{p_l})^2 \sum_{\delta \in \Omega} (I^r_{p_r+\delta} - \bar{I}^r_{p_r})^2}} \quad (4)$$

is the correlation coefficient. Other matching cost functions may also be used, including without limitation shiftable window approaches (e.g., using 3×3 pixel windows or larger) or rectangular window approaches (e.g., using 3×7 windows).

Figure 4:
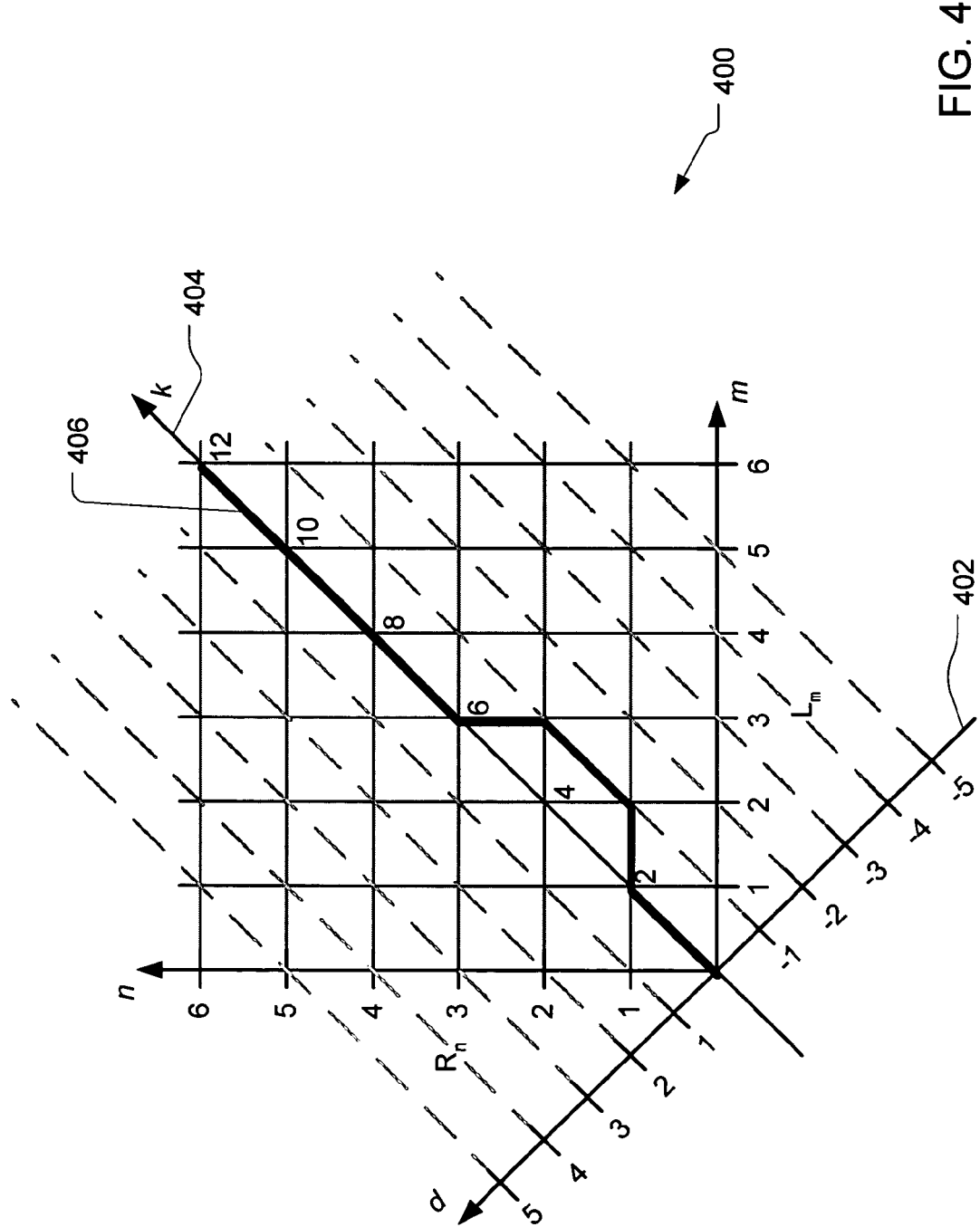
FIG. 4 illustrates disparity and cyclopean axes overlaid on the L and R axes.

FIG. 4 illustrates disparity and cyclopean axes overlaid on the L and R axes to show an exemplary stereo disparity graph 400. Based on the disparity axis 402, a disparity vector d in cyclopean coordinates k along the cyclopean axis 404 can be graphed into the pixel coordinates m and n. The cyclopean coordinate k corresponding to pixel coordinates m and n is computed as k=m+n. The bold line marks the minimum cost path 406 in the stereo disparity graph 400.

Different segments of the minimum cost path 406 represent different characteristics of the stereo images. A diagonal path on the d=0 axis (as seen between k=0 to 2) represents a zero-disparity, linear match between pixels in the epipolar lines of the right and left images. This linear match might happen, for example, when the pixels are of distant objects in which no parallax is evident. In contrast, a diagonal path off of the d=0 axis (as seen between k=3 to 5) represents a disparate (disparity=−1), linear match between pixels in the epipolar lines of the right and left images. In both cases, a diagonal line on the minimum cost path 406 represents matched pixels.

Horizontal and vertical lines (as seen between d=2 to 3) in the minimum cost path 406 have traditionally been considered to represent only occluded regions. For example, in FIG. 4, horizontal lines would be deemed to indicate pixels that are occluded from the right camera, while vertical lines would be deemed to indicate pixels that are occluded from the left camera.

However, in an approach described herein, horizontal and vertical lines are considered to indicate at least either occluded pixels or matched pixels of non-fronto-parallel surfaces. Non-fronto-parallel surfaces cause multiple pixels from one camera image to match with a single pixel in the other camera image, thereby inducing a horizontal or vertical line in the stereo disparity graph.

Figure 5:
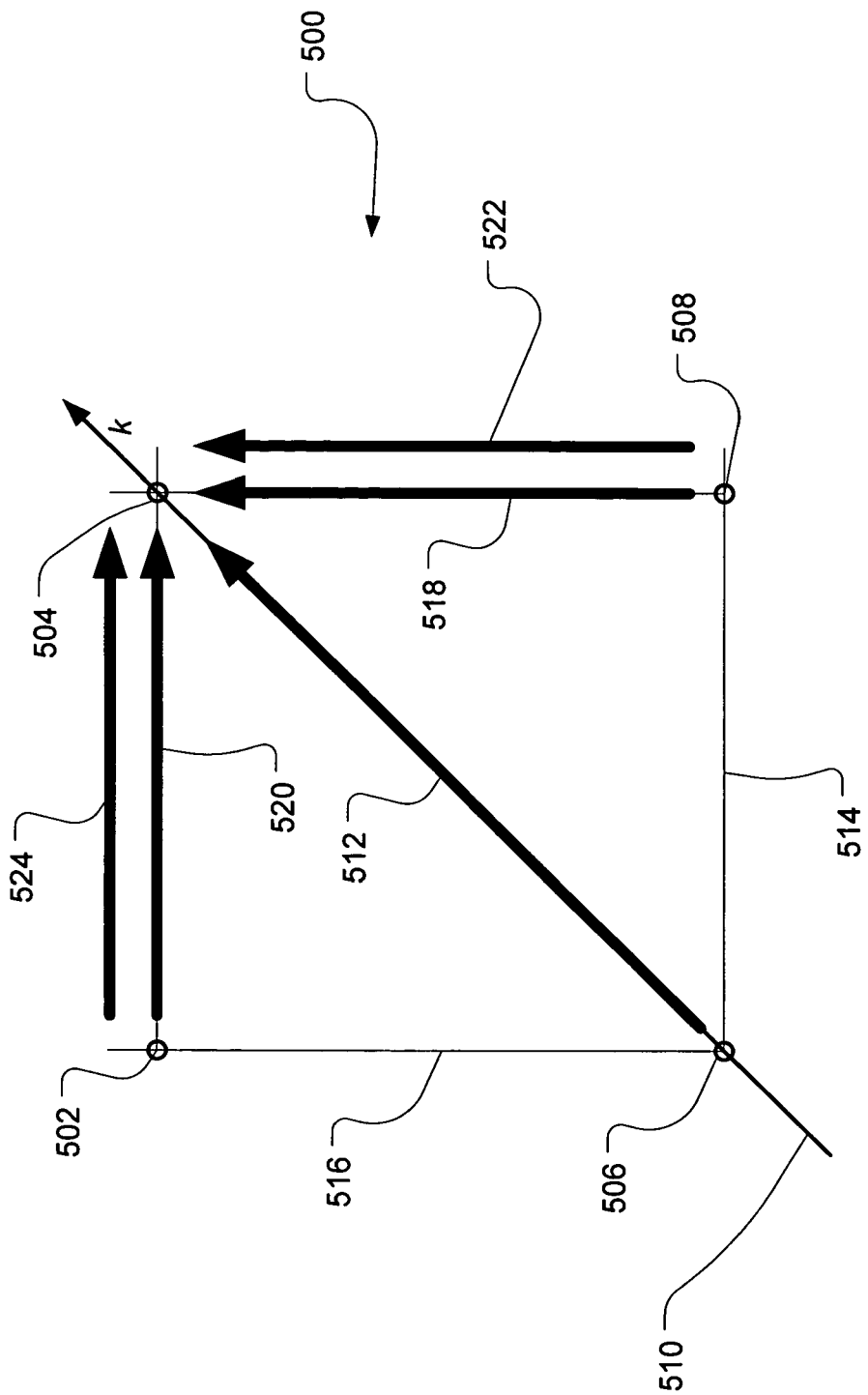
FIG. 5 illustrates an exemplary five-move disparity process model.

FIG. 5 illustrates an exemplary 5-move disparity process model 500. The points 502, 504, 506, and 508 represent possible pixels in the stereo disparity graph, such that the diagonal axis 510 represents a diagonal move 512 between pixels in a stereo disparity graph. The horizontal axis 514 represents a horizontal move between pixels in a stereo disparity graph and the vertical axis 516 represents a horizontal move between pixels in a stereo disparity graph.

However, as discussed above, horizontal and vertical moves (i.e., non-diagonal moves) can represent at least either occluded pixels or matched pixels of non-fronto-parallel surfaces. Therefore, two categories of such moves are designated in each direction: (non-fronto-parallel) matched moves (518 and 520) and occluded moves (522 and 524). As such, FIG. 5 illustrates a 5-move disparity process model, although a 4 move model may also be employed.

FIGS. 6, 7, and 8 combine to represent a 3-plane representation of the 5-move disparity model, but they are split out into separate figures for clarity. The 5 move model applies to moves between adjacent pixels in the stereo disparity graph. In one implementation, to distinguish between (non-fronto-parallel) matched moves and occluded moves, three planes are used: a left-occluded plane L, a matched plane M, and a right-occluded plane R.

In FIG. 6, the moves from an occluded plane to the matched plane are shown (from empty circle to filled circle) in model portion 600. A cost penalty of β is applied to these moves. In FIG. 7, the moves 700 and 702 from the matched plane to an occluded plane are shown (from empty circle to filled circle) in model portion 704. A cost penalty of β is applied to these moves. Also in FIG. 7, the moves 706 and 708 from one pixel in an occluded plane to another pixel in the same occluded plane are shown (from empty circle to filled circle) in the model portion 704. A cost penalty of α is applied to these moves. In one implementation, α is set to 0.5 and β is set to 1.0, although other value combinations are also contemplated. In FIG. 8, the moves from one pixel in the matched plane to another pixel in the matched plane are shown (from empty circle to filled circle) in the model portion 800. No cost penalty is applied to these moves.

The 3-plane model provides a basis for altering the individual costs to distinguish between different types of moves. For example, biasing the penalty costs against inter-plane moves tends to keep runs of occluded or non-occluded pixels together, thus reducing most of the inaccuracies in the reconstruction of occlusions and disparities. Also, logically impossible moves, such as the direct transition between left and right occlusions are prohibited simply by removing certain transitions from the set of allowed transitions in the 3-plane graph.

In one implementation, the cost C(A→B) of a generic transition between two planes A and B is manually set, but it is also possible to set C(A→B) probabilistically. Moreover, it may be assumed that C(A→B) is symmetric (i.e., C(A→B)= C(B→A)). This assumption leads to the two penalty parameters: α being the penalty for a move within an occluded plane, and β being the cost of a move between different planes.

As such, in this exemplary implementation, the matrices of cumulative costs $C_L$, $C_M$, and $C_R$ (one for each plane in the graph) are initialized ∞ everywhere except in the right occluded plane, where:

$$C_R(i,0) = i\alpha \tag{5}$$

and the forward step of the dynamic programming proceeds as follows:

$$C_L(l, r) = \min \begin{cases} C_L(l, r-1) + \alpha \\ C_M(l, r-1) + \beta \end{cases} \tag{6}$$

$$C_M(l, r) = M(l, r) + \min \begin{cases} C_M(l-1, r) \\ C_L(l-1, r) + \beta \\ C_R(l-1, r) + \beta \\ C_M(l, r-1) \\ C_L(l, r-1) + \beta \\ C_R(l, r-1) + \beta \\ C_M(l-1, r-1) \\ C_L(l-1, r-1) + \beta \\ C_R(l-1, r-1) + \beta \end{cases} \tag{7}$$

$$C_R(l, r) = \min \begin{cases} C_R(l-1, r) + \alpha \\ C_M(l-1, r) + \beta \end{cases} \tag{8}$$

wherein M(l,r) is the cost of matching the $l^{th}$ pixel in the left scan line with the $r^{th}$ pixel in the right scan line.

Based on these costs, the minimum cost path is determined for the scan line pair. The matching cost computation and the dynamic programming are repeated for each scan line pair in the stereo images. The synthesis of the cyclopean virtual view can be done for each scan line by taking a point p on the minimum cost path, taking the colors of the corresponding pixels $p_l$ and $p_r$ in the left and right scan lines, averaging them together, and projecting the newly obtained pixel orthogonally to the virtual image plane into the virtual image point $p_v$.

FIG. 9 illustrates an exemplary stereo disparity graph for matched points. A stereo disparity graph 900 shows an axis 902, representing a sequence of positions along a left scan line L, and another axis 904 representing a sequence of positions along a right scan line R. The minimum cost path 906 indicates minimum cost matches between pixels in given sequential positions in L with pixels in given sequential positions in R. The disparity associated with a point on the minimum cost path 906 is defined as the orthogonal distance of the point from a virtual scan line 908.

A matched point p is projected orthogonally onto its corresponding point $p_v$ on the virtual scan line 908 to designate the position of the corresponding cyclopean virtual image pixel on the virtual scan line. The pixel value of the virtual pixel $p_v$ is the average of the corresponding pixels $p_l$ and $p_r$.

FIG. 10 illustrates an exemplary stereo disparity graph for occluded points. A stereo disparity graph 1000 shows an axis 1002, representing a sequence of positions along a left scan line L, and another axis 1004 representing a sequence of positions along a right scan line R. The minimum cost path 1006 indicates minimum cost matches between pixels in given sequential positions in L with pixels in given sequential positions in R. The disparity associated with a point on the minimum cost path 1006 is defined as the orthogonal distance of the point from a virtual scan line 1008.

An occluded point p on the continuation 1010 of the background (with the same disparity) is projected orthogonally onto its corresponding point $p_v$ on the virtual scan line 1008. Because p represents a pixel within a left occlusion in this illustration, the pixel value of $p_v$ is the same as that of the corresponding point $p_r$ on the right view only.

FIG. 11 illustrates exemplary operations for performing gaze manipulation. A receipt operation 1100 receives the stereo images from the stereo cameras. A computation operation 1102 computes the matching cost for each pixel of the epipolar line pair. A filtering operation 1104 filters the matching costs to reduce streaky artifacts caused by scan line independence.

A dynamic programming operation 1106 alters the initially computed individual costs for each pixel pair to designate different types of moves and therefore different types of disparities (e.g., occlusion disparities versus non-fronto-parallel disparities). Based on the altered costs, a minimum cost path is identified in a path operation 1108. An imaging operation 1110 determines the cyclopean virtual scan line based on the minimum cost path in the stereo disparity graph.

While FIGS. 5-8 address a five-move, three-plane disparity model, other models may also be employed. For example, a four-move, four-plane model can prove as reliable and easier to use. In particular, in one implementation of a four-move mode, every possible path through the cost space has the same length (i.e., the same Manhattan distance between the opposite corners of the cost space), thus making the comparison of path costs more meaningful. Furthermore, the removal of the diagonal move (see move 512 in FIG. 5) makes the model symmetrical and thus more suitable for a possible probabilistic formulation.

FIG. 12 illustrates an exemplary four-move disparity process model 1200. The points 1202, 1204, 1206, and 1208 represent possible pixels in the stereo disparity graph, such that the diagonal axis 1210 a zero-disparity axis in a stereo disparity graph. However, in the four-move model 1200, no diagonal move is modeled. The horizontal axis 1214 represents a horizontal move between pixels in a stereo disparity graph and the vertical axis 1216 represents a horizontal move between pixels in a stereo disparity graph.

As discussed above, horizontal and vertical moves (i.e., non-diagonal moves) can represent at least either occluded pixels or matched pixels of non-fronto-parallel surfaces. Therefore, two categories of such moves are designated in each direction: (non-fronto-parallel) matched moves (1218 and 1220) and occluded moves (1222 and 1224). As such, FIG. 12 illustrates a four-move disparity process model.

FIGS. 13, 14, and 15 combine to represent a four-plane representation of the four-move disparity model, but they are split out into separate figures for clarity. The four-move model applies to moves between adjacent pixels in the stereo disparity graph. In the illustrated implementation, to distinguish between (non-fronto-parallel) matched moves and occluded moves, four planes are used: a left-occluded plane $L_O$, a left matched plane $L_M$, a right matched plane $R_M$, and a right-occluded plane $R_O$. In this model, a typical "matched" move, which in a five-move model would involve a diagonal move, would involve two matched moves, one vertical and one horizontal in a 2D graph or a two-move oscillation between two adjacent matched planes (e.g., from $L_M$ to $R_M$ and back to $L_M$).

In FIG. 13, the moves within individual planes are shown (from empty circle to filled circle) in model portion 1300. Again, logically impossible moves, such as the direct transition between left and right occlusions are prohibited simply by removing certain transitions from the set of allowed transitions in the four-plane graph. A cost penalty of α is applied to the moves with the occluded planes $L_O$ and $R_O$, and a cost penalty of γ+M(l,r) for moves within the matched planes $L_M$ and $R_M$. In FIG. 14, the moves between an occluded plane and an adjacent matched plane are shown (from empty circle to filled circle) in model portion 1400. A cost penalty of β+M(l,r) is applied to moves from an occluded plane to an adjacent matched plane, a cost penalty of β is applied to moves from a matched plane to an adjacent occluded plane, and a cost penalty of M(l,r) is applied to moves between matched planes. In FIG. 15, the moves between an occluded plane and a non-adjacent matched plane are shown (from empty circle to filled circle) in model portion 1500. A cost penalty of β+M(l,r) is applied to moves from an occluded plane to a non-adjacent matched plane, and a cost penalty of β is applied to moves from a matched plane to a non-adjacent occluded plane. In one implementation, α is set to 0.5, β is set to 1.0, and γ is set to 0.25, although other value combinations are also contemplated.

The four-plane model provides a basis for altering the individual costs to distinguish between different types of moves. For example, heavily biasing the penalty costs against moves in and out of an occluded plane tends to keep runs of occluded pixels together, thus reducing most of the inaccuracies in the reconstruction of occlusions and disparities. Therefore, once a path enters an occluded plane, the path is encouraged to stay in that plane unless a pair of strongly matched pixels is found (i.e., low M(l,r) cost). In contrast, biasing moves within a single matched plane, albeit less heavily, discourages runs of matched moves, thereby favoring surfaces that are close to fronto-parallel. Hence, in this model, slanted surfaces are modeled as oscillations between the two matched planes.

As such, in this exemplary implementation, the matrices of cumulative costs $C_{L_O}$, $C_{L_M}$, $C_{R_M}$, and $C_{R_O}$ (one for each plane in the graph) are initialized to +∞ everywhere except in the right occluded plane, where:

$$C_{R_O}(i, 0) = i\alpha \quad (9)$$

and the forward step of the dynamic programming proceeds as follows:

$$C_{L_O}(l, r) = \min \begin{cases} C_{L_O}(l, r-1) + \alpha \\ C_{L_M}(l, r-1) + \beta \\ C_{R_M}(l, r-1) + \beta \end{cases} \quad (9)$$

$$C_{L_M}(l, r) = M(l, r) + \min \begin{cases} C_{L_M}(l, r-1) + \gamma \\ C_{R_M}(l, r-1) \\ C_{L_O}(l, r-1) + \beta \\ C_{R_O}(l, r-1) + \beta \end{cases} \quad (10)$$

$$C_{R_M}(l, r) = M(l, r) + \min \begin{cases} C_{L_M}(l-1, r) \\ C_{R_M}(l-1, r) + \gamma \\ C_{L_O}(l-1, r) + \beta \\ C_{R_O}(l-1, r) + \beta \end{cases} \quad (11)$$

$$C_{R_O}(l, r) = \min \begin{cases} C_{R_O}(l-1, r) + \alpha \\ C_{L_M}(l-1, r) + \beta \\ C_{R_M}(l-1, r) + \beta \end{cases} \quad (12)$$

wherein M(l,r) is the cost of matching the $l^{th}$ pixel in the left scan line with the $r^{th}$ pixel in the right scan line.

Based on these costs, the minimum cost path is determined for the scan line pair. The matching cost computation and the dynamic programming are repeated for each scan line pair in the stereo images. The synthesis of the cyclopean virtual view can be done for each scan line by taking a point p on the minimum cost path, taking the colors of the corresponding pixels $p_l$ and $p_r$ in the left and right scan lines, averaging them together, and projecting the newly obtained pixel orthogonally to the virtual image plane into the virtual image point $p_v$.

The exemplary hardware and operating environment of FIG. 16 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of as computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 16. The logical connections depicted in FIG. 16 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a dynamic programming module, a cyclopean virtual image generator, and other modules may be incorporated as part of the operating system 35, application programs 36, or other program modules 37. The stereo disparity graph data, matching costs, altered costs, and cyclopean virtual image data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A computer-implemented method carried out by a computer including at least one processor coupled to memory storing computer-executable instructions that cause the computer to carry out the method, the method comprising:
   computing a minimum cost path in a stereo disparity model between a scan line of a first image and a corresponding scan line of a second image of a stereo image pair, the stereo disparity model distinguishing between non-fronto-parallel matched pixels in each scan line and occluded pixels in each scan line, the computing comprising applying a geometric three plane model to distinguish non-fronto-parallel matched moves from occluded moves between adjacent pixels in the stereo disparity model.

2. The computer-implemented method of claim 1 wherein the computing operation comprises:
   computing matching costs for each pixel of each scan line pair.

3. The computer-implemented method of claim 1 wherein the computing operation comprises:
   computing matching costs for each pixel of each scan line pair using a windowed matching cost function.

4. The computer-implemented method of claim 2 wherein the computing operation comprises:
   altering the matching costs for at least one pixel pair based on whether the pixel pair is determined to be associated with a non-fronto-parallel surface or an occlusion.

5. The computer-implemented method of claim 1 wherein the computing operation comprises:
   determining a minimum cost path in the stereo disparity model using anisotropic smoothing.

6. The computer-implemented method of claim 1 wherein the computing operation comprises:
   applying a cost penalty to a move from an occluded pixel pair to a matched pixel pair.

7. The computer-implemented method of claim 1 wherein the computing operation comprises:
   applying a cost penalty to a move from a matched pixel pair to an occluded pixel pair.

8. The computer-implemented method of claim 1 wherein the computing operation comprises:
   applying a cost penalty to a move from an occluded pixel pair to another occluded pixel pair.

9. The computer-implemented method of claim 1 wherein the computing operation comprises:
   applying a first cost penalty to a move from an occluded pixel pair to another occluded pixel pair; and
   applying a second cost penalty to a move from a matched pixel pair to an occluded pixel pair, the first cost penalty being different than the second cost penalty.

10. The computer-implemented method of claim 1 wherein the computing operation comprises:
    applying a first cost penalty to a move from an occluded pixel pair to another occluded pixel pair; and
    applying a second cost penalty to a move from a matched pixel pair to an occluded pixel pair, the first cost penalty being less than the second cost penalty.

11. The computer-implemented method of claim 1 further comprising:
    computing a cyclopean virtual image scan line based on corresponding pixels of the scan lines of the first and second images, a disparity of the corresponding pixels being characterized by a minimum cost path of the stereo disparity model.

12. The computer-implemented method of claim 1 further comprising:
    computing a cyclopean virtual image scan line based on corresponding pixels of the scan lines of the first and second images, wherein corresponding pixels that are matched are projected as a virtual pixel onto the cyclopean virtual image scan line.

13. The computer-implemented method of claim 1 further comprising:
    computing a cyclopean virtual image scan line based on corresponding pixels of the scan lines of the first and second images, wherein corresponding pixels that are averaged to determined a value of a resulting virtual pixel on the cyclopean virtual image scan line.

14. The computer-implemented method of claim 1 further comprising:
computing a cyclopean virtual image scan line based on corresponding pixels of the scan lines of the first and second images, wherein a non-occluded pixel of an occluded pair of corresponding pixels is projected as a virtual pixel onto the cyclopean virtual image scan line from a background disparity in the stereo disparity model.

15. The computer-implemented method of claim 1 further comprising:
computing a cyclopean virtual image scan line based on corresponding pixels of the scan lines of the first and second images, wherein a value of a non-occluded pixel of an occluded pair of corresponding pixels is selected as a value of a resulting virtual pixel on the cyclopean virtual image scan line.

16. A computer program product encoding a computer program for executing on a computer system a computer process, the computer process comprising:
computing a minimum cost path in a stereo disparity model between a scan line of a first image and a corresponding scan line of a second image of a stereo image pair, the stereo disparity model distinguishing between non-fronto-parallel matched pixels in each scan line and occluded pixels in each scan line, the computing comprising distinguishing between non-fronto-parallel matched moves and occluded moves between adjacent pixels within a geometric three plane model, the geometric three plane model including a right occluded plane, a left occluded plane and a matched plane, the distinguishing between non-fronto-parallel matched moves and occluded moves including biasing to keep runs of non-fronto-parallel matched pixels or occluded pixels together.

17. The computer program product of claim 16 wherein the computing operation comprises:
computing matching costs for each pixel of each scan line pair.

18. The computer program product of claim 16 wherein the computing operation comprises:
computing matching costs for each pixel of each scan line pair using a windowed matching cost function.

19. The computer program product of claim 17 wherein the computing operation comprises:
altering the matching costs for at least one pixel pair based on whether the pixel pair is determined to be associated with a non-fronto-parallel surface or an occlusion.

20. The computer program product of claim 16 wherein the computing operation comprises:
determining a minimum cost path in the stereo disparity model using anisotropic smoothing.

21. The computer program product of claim 16 wherein the computing operation comprises:
applying a cost penalty to a move from an occluded pixel pair to a matched pixel pair.

22. The computer program product of claim 16 wherein the computing operation comprises:
applying a cost penalty to a move from a matched pixel pair to an occluded pixel pair.

23. The computer program product of claim 16 wherein the computing operation comprises:
applying a cost penalty to a move from an occluded pixel pair to another occluded pixel pair.

24. The computer program product of claim 16 wherein the computing operation comprises:
applying a first cost penalty to a move from an occluded pixel pair to another occluded pixel pair; and
applying a second cost penalty to a move from a matched pixel pair to an occluded pixel pair, the first cost penalty being different than the second cost penalty.

25. The computer program product of claim 16 wherein the computing operation comprises:
applying a first cost penalty to a move from an occluded pixel pair to another occluded pixel pair; and
applying a second cost penalty to a move from a matched pixel pair to an occluded pixel pair, the first cost penalty being less than the second cost penalty.

26. The computer program product of claim 16 wherein the computer process further comprises:
computing a cyclopean virtual image scan line based on corresponding pixels of the scan lines of the first and second images, a disparity of the corresponding pixels being characterized by a minimum cost path of the stereo disparity model.

27. The computer program product of claim 16 wherein the computer process further comprises:
computing a cyclopean virtual image scan line based on corresponding pixels of the scan lines of the first and second images, wherein corresponding pixels that are matched are projected as a virtual pixel onto the cyclopean virtual image scan line.

28. The computer program product of claim 16 wherein the computer process further comprises:
computing a cyclopean virtual image scan line based on corresponding pixels of the scan lines of the first and second images, wherein corresponding pixels that are averaged to determined a value of a resulting virtual pixel on the cyclopean virtual image scan line.

29. The computer program product of claim 16 wherein the computer process further comprises:
computing a cyclopean virtual image scan line based on corresponding pixels of the scan lines of the first and second images, wherein a non-occluded pixel of an occluded pair of corresponding pixels is projected as a virtual pixel onto the cyclopean virtual image scan line from a background disparity in the stereo disparity model.

30. The computer program product of claim 16 wherein the computer process further comprises:
computing a cyclopean virtual image scan line based on corresponding pixels of the scan lines of the first and second images, wherein a value of a non-occluded pixel of an occluded pair of corresponding pixels is selected as a value of a resulting virtual pixel on the cyclopean virtual image scan line.

31. A system comprising:
a dynamic programming module configured to use a geometric three plane model for dynamic programming to compute a minimum cost path in a stereo disparity model between a scan line of a first image and a corresponding scan line of a second image of a stereo image pair, the stereo disparity model distinguishing between non-fronto-parallel matched pixels in each scan line and occluded pixels in each scan line, the dynamic programming module further configured to apply the geometric three plane model to distinguish between non-fronto-parallel matched moves and occluded moves between adjacent pixels in the stereo disparity model; and
a processor.

32. The system of claim 31 wherein the dynamic programming module computes matching costs for each pixel of each scan line pair.

33. The system of claim 31 wherein the dynamic programming module computes matching costs for each pixel of each scan line pair using a windowed matching cost function.

34. The system of claim 32 wherein the dynamic programming module alters the matching costs for at least one pixel pair based on whether the pixel pair is determined to be associated with a non-fronto-parallel surface or an occlusion.

35. The system of claim 31 wherein the dynamic programming module determines a minimum cost path in the stereo disparity model using anisotropic smoothing.

36. The system of claim 31 wherein the dynamic programming module applies a cost penalty to a move from an occluded pixel pair to a matched pixel pair.

37. The system of claim 31 wherein the dynamic programming module applies a cost penalty to a move from a matched pixel pair to an occluded pixel pair.

38. The system of claim 31 wherein the dynamic programming module applies a cost penalty to a move from an occluded pixel pair to another occluded pixel pair.

39. The system of claim 31 wherein the dynamic programming module applies a first cost penalty to a move from an occluded pixel pair to another occluded pixel pair and a second cost penalty to a move from a matched pixel pair to an occluded pixel pair, the first cost penalty being different than the second cost penalty.

40. The system of claim 31 wherein the dynamic programming module applies a first cost penalty to a move from an occluded pixel pair to another occluded pixel pair and a second cost penalty to a move from a matched pixel pair to an occluded pixel pair, the first cost penalty being less than the second cost penalty.

41. The system of claim 31 further comprising:
a cyclopean virtual image generator computing a cyclopean virtual image scan line based on corresponding pixels of the scan lines of the first and second images, a disparity of the corresponding pixels being characterized by a minimum cost path of the stereo disparity model.

42. The system of claim 31 further comprising:
a cyclopean virtual image generator computing a cyclopean virtual image scan line based on corresponding pixels of the scan lines of the first and second images, wherein corresponding pixels that are matched are projected as a virtual pixel onto the cyclopean virtual image scan line.

43. The system of claim 31 further comprising:
a cyclopean virtual image generator computing a cyclopean virtual image scan line based on corresponding pixels of the scan lines of the first and second images, wherein corresponding pixels that are averaged to determined a value of a resulting virtual pixel on the cyclopean virtual image scan line.

44. The system of claim 31 further comprising:
a cyclopean virtual image generator computing a cyclopean virtual image scan line based on corresponding pixels of the scan lines of the first and second images, wherein a non-occluded pixel of an occluded pair of corresponding pixels is projected as a virtual pixel onto the cyclopean virtual image scan line from a background disparity in the stereo disparity model.

45. The system of claim 31 further comprising:
a cyclopean virtual image generator computing a cyclopean virtual image scan line based on corresponding pixels of the scan lines of the first and second images, wherein a value of a non-occluded pixel of an occluded pair of corresponding pixels is selected as a value of a resulting virtual pixel on the cyclopean virtual image scan line.

* * * * *